United States Patent [19]
Antonelli et al.

[11] Patent Number: 5,770,646
[45] Date of Patent: Jun. 23, 1998

[54] AQUEOUS BRANCHED POLYMER DISPERSANT FOR HYDROPHOBIC MATERIALS

[75] Inventors: Joseph Albert Antonelli, Riverton, N.J.; Christopher Scopazzi, Wilmington, Del.; Kerstin Stranimaier, Hennef, Germany

[73] Assignee: E. I. du Pont de Nemours and Company, Wilmington, Del.

[21] Appl. No.: 740,464

[22] Filed: Oct. 29, 1996

[51] Int. Cl.$^6$ .............................. C08L 51/00; C08L 61/32; C08L 61/28
[52] U.S. Cl. .............................. 524/504; 524/512; 525/66
[58] Field of Search .................................. 524/204, 512; 525/66

[56] References Cited

U.S. PATENT DOCUMENTS

| | | | |
|---|---|---|---|
| 4,255,308 | 3/1981 | Brasen | 260/29.5 |
| 4,264,742 | 4/1981 | Golden et al. | 521/64 |
| 4,680,352 | 7/1987 | Janowicz et al. | 526/147 |
| 4,722,984 | 2/1988 | Janowicz | 526/123 |
| 4,746,714 | 5/1988 | Spinelli et al. | 525/286 |
| 4,754,014 | 6/1988 | Ryntz et al. | 528/28 |
| 4,804,732 | 2/1989 | Ryntz et al. | 528/28 |
| 4,870,140 | 9/1989 | Ryntz | 525/440 |
| 4,940,760 | 7/1990 | Boettcher et al. | 526/190 |
| 4,985,160 | 1/1991 | Henry et al. | 252/51.5 R |
| 5,019,634 | 5/1991 | Boettcher et al. | 526/262 |
| 5,231,131 | 7/1993 | Chu et al. | 524/504 |
| 5,264,530 | 11/1993 | Darmon et al. | 526/194 |
| 5,374,698 | 12/1994 | Young et al. | 526/264 |
| 5,412,039 | 5/1995 | Barsotti et al. | 525/309 |
| 5,424,364 | 6/1995 | Simms et al. | 525/170 |
| 5,464,916 | 11/1995 | Young et al. | 526/264 |
| 5,468,477 | 11/1995 | Kumar et al. | 424/78.17 |
| 5,502,113 | 3/1996 | Antonelli et al. | 525/287 |

FOREIGN PATENT DOCUMENTS

| | | |
|---|---|---|
| 3903804-A | 8/1990 | Germany . |
| 4034605-A | 5/1992 | Germany . |
| 03028277-A | 2/1991 | Japan . |
| 04045171-A | 2/1992 | Japan . |
| WO 92/15628 | 9/1992 | WIPO . |
| WO 95/19999 | 7/1995 | WIPO . |
| WO 95/32228 | 11/1995 | WIPO . |
| WO 95/32229 | 11/1995 | WIPO . |
| WO 95/32255 | 11/1995 | WIPO . |

*Primary Examiner*—Patricia A. Short
*Attorney, Agent, or Firm*—Hilmar L. Fricke

[57] ABSTRACT

A waterbased dispersion useful for forming aqueous coating compositions containing dispersed hydrophobic material, an aqueous carrier and a branched polymer dispersant (binder);

the branched polymer has a weight average molecular weight of about 5,000–100,000 and contains 20–80% by weight of a hydrophilic backbone and correspondingly 80–20% by weight of macromonomer side chains; wherein the backbone is of polymerized ethylenically unsaturated monomers and 2–30% by weight, based on the weight of the backbone of polymerized ethylenically unsaturated monomers having an acid-functional group; and wherein at least 10% of the acid-functional groups are neutralized with an amine or an inorganic base and is hydrophilic in comparison to the side chains; and the side chains are of macromonomers of polymerized ethylenically unsaturated monomers that are polymerized into the backbone via an ethylenically unsaturated group and the macromonomers have a weight average molecular weight of about 1,000–30,000 and wherein the weight ratio of hydrophobic material to binder is about 1/100–200/100.

8 Claims, No Drawings

AQUEOUS BRANCHED POLYMER DISPERSANT FOR HYDROPHOBIC MATERIALS

TECHNICAL FIELD

This invention relates to improved waterborne dispersions containing an aqueous branched polymer dispersant and a dispersed hydrophobic material.

BACKGROUND OF THE INVENTION

Waterborne coating compositions are widely used to coat automobiles and trucks since these compositions have substantially reduced VOC (volatile organic content) and meet with stringent pollution regulations. Typically, these coating contain a latex as the main film forming component, a crosslinking agent, and other non-latex resins, additives and pigments. The latex to keep it dispersed in an aqueous medium can contain surfactant, and/or the latex polymer contains anionic or cationic groups which when formed into a salt with an acid used for cationic groups or a base used for anionic groups. The presence of surfactant, cationic or anionic constituents in a finished formed from such a coating composition cause defects such as water spotting, poor resistance to humidity and increase acid etching caused by acid rain and the finish has poor resistance to exterior weathering. To improve such defects in a coating, hydrophobic constituents can be added to the coating composition such as hydrophobic melamine crosslinking resins and hydrophobic polymers. However, these hydrophobic constituents are very difficult to disperse in an aqueous medium.

Water dispersible polymers that are used as dispersants for pigments and used to form pigment dispersions for formulating waterborne coating compositions are known in the art and may be considered as a dispersant for such hydrophobic materials. U.S. Pat. No. 5,231,131, issued Jul. 27, 1993 to Chu et al shows aqueous graft polymer pigment dispersants in which the side chains of the graft copolymer contain carboxyl groups that are neutralized with an inorganic base or an amine. While these graft copolymers are used as dispersants for pigments, relatively large amounts of polymerized ethylenically unsaturated acid monomers are present in the side chains of the graft copolymer to provide water dispersibility but the presence of these acid groups in the graft copolymer makes a coating formed with such a copolymer sensitive to water and would not be suitable for dispersing hydrophobic materials in a coating.

A polymer dispersant is needed that will adequately disperse hydrophobic components used in coating compositions such as crosslinking agents like melamine crosslinking agents, hydrophobic polymers like acrylic polymers and polyesters and mixtures of such components and the polymeric dispersant contains relatively small amounts of polymerized acid monomers. When dispersion of such a polymer is formulated into a waterborne coating composition, a finish is formed that is free from the undesirable effects of exposure to water and weathering.

SUMMARY OF THE INVENTION

A waterbased dispersion useful for forming aqueous coating compositions containing dispersed hydrophobic material, an aqueous carrier and a branched polymer dispersant (binder);

the branched polymer has a weight average molecular weight of about 5,000–100,000 and contains 20–80% by weight of a hydrophilic backbone and correspondingly 80–20% by weight of macromonomer side chains; wherein the backbone of the branched polymer is of polymerized ethylenically unsaturated monomers and 2–30% by weight, based on the weight of the backbone of polymerized ethylenically unsaturated monomers having an acid- functional group; and wherein at least 10% of the acid-functional groups are neutralized with an amine or an inorganic base and is hydrophilic in comparison to the side chains; and the side chains are of macromonomers of polymerized ethylenically unsaturated monomers that are polymerized into the backbone via an ethylenically unsaturated group and the macromonomers have a weight average molecular weight of about 1,000–30,000 and wherein the weight ratio of hydrophobic material to binder is about 1/100–200/100.

DETAILED DESCRIPTION OF THE INVENTION

The novel dispersion of this invention of a hydrophobic material dispersed by the branched polymer is stable and in general is non flocculated or agglomerated and is compatible with a variety of polymeric film forming binders that are conventionally used in waterborne coating compositions and in particular compatible with acrylic polymers that are used in waterborne coatings. The branched polymer dispersant upon curing of the coating composition into which it has been incorporated reacts with other film forming components of the coating composition and becomes part of the film and does not cause deterioration of the film upon weathering as may occur if it remained an unreacted component of the film. Also, since the branched polymer is an excellent dispersant, the ratio of polymer to hydrophobic component being dispersed is less than used with conventional dispersants. Further, the branched polymers allow for the use of higher molecular weight polymers that have a lower viscosity in comparison to linear polymers of the same composition that have the same molecular weight. The acid content of the backbone of the branch polymer can readily be adjusted to maximize dispersion properties of the polymer without increasing molecular weight and not detract from the performance properties of a coating composition into which a dispersion of this polymer has been incorporated. Finishes of aqueous coatings formulated with dispersions containing these branched polymers are hard, water and humidity resistant.

The branched polymer used to formulate the dispersion of this invention is prepared from a macromonomer which forms the side chains of the branched polymer and comprises polymerized alpha-beta ethylenically unsaturated monomers and has one terminal ethylenically unsaturated moiety and has a weight average molecular weight (MW) of 1,000–30,000, preferably 6,000 to 15,000. About 20–80% (by weight), preferably 30–70%, of the macromonomer is copolymerized with 80–20%, preferably 70–30%, of a blend of other alpha, beta-ethylenically unsaturated monomers which form the backbone of the branched polymer, at least 2%, preferably 2–30% by weight, most preferably 3–15%, of the alpha, beta ethylenically unsaturated monomers of the backbone have carboxylic acid functionality, to form a branched polymer with a MW of 5,000–100,000, preferably 5,000–40,000, which after neutralizing with an amine or other neutralizing agent can be dispersed in water.

All molecular weights herein are determined by GPC (gel permeation chromatography) using a polystyrene standard.

It has been found that improved aqueous or waterborne coating compositions are obtained by using these branched polymers as dispersants for hydrophobic materials such as certain crosslinking agents and hydrophobic polymers. These coating compositions also contain a film forming binder usually an acrylic polymer. Such compositions have the advantage of providing excellent coating properties desirable for automotive finishes.

The side chains of the branched polymer are hydrophobic relative to the backbone and therefore contain less than 1% by weight, preferably essentially zero percent by weight, based on the weight of the branched polymer, of polymerized ethylenically unsaturated acid-functional monomers which are listed hereinafter. The side chains contain polymerized hydrophobic monomers such as alkyl methacrylates and acrylates, cycloaliphatic methacrylates and acrylates and aryl methacrylates and acrylates and styrene as are listed hereinafter and also may contain up to 30% by weight, based on the weight of the branched polymer, of polymerized ethylenically unsaturated non-hydrophobic monomers which may contain functional groups.

Examples of such monomers are hydroxy ethyl acrylate, hydroxy ethyl methacrylate, acrylamide, nitro phenol acrylate, nitro phenol methacrylate, phthalimido methyl acrylate, phthalmido methacrylate, acryloamido propane sulfonic acid, and mixtures thereof.

The acrylic macromonomer may be prepared using a free radical initiator in a solvent with a Co (II) or Co (III) chelate chain transfer agent.

The backbone of the branched polymer contains at least 2 percent by weight of an acid functional (neutralized) monomer as, e.g., acrylic acid, methacrylic acid, maleic acid, itaconic acid and the like. Methacrylic and acrylic acid are preferred. Other acids that can be used are ethylenically unsaturated sulfonic, sulfinic, phosphoric or phosphonic acid and esters thereof; typically, styrene sulfonic acid, acrylamido methyl propane sulfonic acid, vinyl phosphonic or phosphoric acid and its esters and the like also can be used.

The backbone of the branched polymer preferably contains 2–30% by weight methacrylic acid or acrylic acid and preferably, 3 to 15% by weight and has a MW of 1,000–70,000. The acid functional groups on the branched polymer are neutralized with an inorganic base or an amine. The backbone is thus relatively hydrophilic in comparison to the side chains and the branched polymer keeps the hydrophobic constituents well dispersed in the resulting coating composition. Of course, relative hydrophobicity or hydrophilicity of the backbone and side chains of the branched polymer could be further adjusted by varying the percent of acid and/or hydroxy functional monomers versus more hydrophobic monomers such as 2-ethyl hexyl methacrylate.

In one preferred embodiments, the branched polymer contains overall (including both backbone and macromonomer arms) about 0 to 40, preferably 5 to 40, and more preferably 10 to 30, percent of hydroxy functional acrylic monomers as, e.g., 2-hydroxyethyl acrylate, 2-hydroxyethyl methacrylate, 2-hydroxypropyl acrylate, 2-hydroxypropyl methacrylate, 2-hydroxybutyl acrylate, 4-hydroxybutyl acrylate and the like. These hydroxy groups can be used for crosslinking in addition to the acid groups. Hydroxy groups are not necessary when acid groups are the only crosslinking functionality on the copolymer. Hydroxy groups are necessary when the cross-linking agent of the coating composition is a melamine or a blocked polyisocyanate.

As indicated earlier, the branched polymer comprises macromonomer side chains attached to a polymeric backbone. Each macromonomer ideally contains a single terminal ethylenically unsaturated group which is polymerized into the backbone of the branched polymer and typically contains polymerized monomers of styrene, esters and/or nitriles and/or amides of methacrylic or acrylic acid or mixtures of these monomers.

Other polymerized ethylenically unsaturated monomers can be present in the macromonomer and backbone, for example (but not limited to), acrylic and methacrylic acid esters of straight-chain or branched monoalcohols of 1 to 20 carbon atoms. Alkyl acrylates and methacrylates having 1–12 carbons in the alkyl group can be used such as methyl acrylate, ethyl acrylate, propyl acrylate, isopropyl acrylate, butyl acrylate, pentyl acrylate, hexyl acrylate, 2-ethyl hexyl acrylate, nonyl acrylate, lauryl acrylate, methyl methacrylate, ethyl methacrylate, propyl methacrylate, isopropyl methacrylate, butyl methacrylate, pentyl methacrylate, hexyl methacrylate, 2-ethyl hexyl methacrylate, nonyl methacrylate, lauryl methacrylate and the like can be used. Cycloaliphatic acrylates methacrylates can be used such as trimethylcyclohexyl acrylate, t-butyl cyclohexyl acrylate, cyclohexyl methacrylate, isobornyl methacrylate, 2-ethylhexyl methacrylate, and the like. Aryl acrylates and methacrylates such as benzyl acrylate and benzyl methacrylate also can be used.

Ethylenically unsaturated monomers containing hydroxy functionality include hydroxy alkyl acrylates and hydroxy alkyl methacrylates, wherein the alkyl has 1 to 12 carbon atoms. Suitable monomers include hydroxy ethyl acrylate, hydroxy propyl acrylate, hydroxy isopropyl acrylate, hydroxy butyl acrylate, hydroxy ethyl methacrylate, hydroxy propyl methacrylate, hydroxy isopropyl methacrylate, hydroxy butyl methacrylate, and the like, and mixtures thereof.

Suitable other olefinically unsaturated comonomers include: acrylamide and methacrylamide and derivatives as alkoxy methyl (meth) acrylamide monomers, such as methacrylamide, N-isobutoxymethyl methacrylamide, and N-methylol methacrylamide; maleic, itaconic and fumaric anhydride and its half and diesters; vinyl aromatics such as styrene, alpha methyl styrene and vinyl toluene; and polyethylene glycol monoacrylates and monomethacrylates.

The above monomers also can be used in the backbone of the branched polymer.

The branched polymer may be prepared by polymerizing ethylenically unsaturated monomers in the presence of macromonomers each having a terminal ethylene unsaturation. The resulting branched polymer can be envisioned as being composed of a backbone having a plurality of macromonomer "arms" attached thereto.

In the present composition, both the macromonomer arms and the backbone may have reactive functionality capable of reacting with a crosslinking compound or polymer, although it is optional to have such reactive functionality only or essentially only or substantially only on the backbone.

It is to be understood that the backbone or macromonomers referred to as having functionality may be part of a mixture of macromonomers of which a portion do not have any functionality or variable amounts of functionality. It is also understood that, in preparing any backbone or macromonomers, there is a normal distribution of functionality.

To ensure that the resulting macromonomer only has one terminal ethylenically unsaturated group which will polymerize with the backbone monomers to form the branched polymer, the macromonomer is polymerized by using a catalytic chain transfer agent. Typically, in the first step of the process for preparing the macromonomer, the monomers are blended with an inert organic solvent which is water miscible or water dispersible and a cobalt chain transfer agent and heated usually to the reflux temperature of the reaction mixture. In subsequent steps additional monomers and cobalt catalyst and conventional polymerization catalyst are added and polymerization is continued until a macromonomer is formed of the desired molecular weight.

Preferred cobalt chain transfer agents or catalysts are described in U.S. Pat. No. 4,680,352 to Janowicz et al and U.S. Pat. No. 4,722,984 to Janowicz. Most preferred are pentacyanocobaltate (II), diaquabis(borondifluorodimethylglyoximato) cobaltate(II) and diaquabis (borondifluorophenyl glyoximato) cobaltate (II). Cobalt (III) versions of these catalysts are also preferred. Typically these chain transfer agents are used at concentrations of about 5–1000 ppm based on the monomers used.

The macromonomer is preferably formed in a solvent or solvent blend using a free radical initiator and a Co (II) or (III) chelate chain transfer agent. Examples of solvents are aromatics, aliphatics, ketones, glycol ethers, acetates, alcohols as, e.g., methyl ethyl ketone, isopropyl alcohol, n-butyl glycol ether, n-butyl diethylene glycol ether, propylene glycol methyl ether acetate, propylene glycol methyl ether, and N-butanol.

Peroxy- and azo-initiators (0.5–5% weight, based on the weight of the monomer) can be used in the synthesis of the macromonomers in the presence of 2–5,000 ppm (on total monomer) or Co (II) chelate in the temperature range between 70°–160° C., more preferably azo-type initiators as, e.g., 2,2'-azobis (2,4 dimethylpentane nitrile), 2,2'-azobis (2-methylpropane nitrile), 2,2'-azobis (2-methylbutane nitrile), 1,1'-azo (cyclohexane carbonitrile) and 4,4'-azobis (4-cyanopentanoic) acid.

After the macromonomer is formed as described above, solvent is optionally stripped off and the backbone monomers are added to the macromonomer along with additional solvent and polymerization catalyst. Any of the aforementioned azo-type catalysts can be used as can other suitable catalysts such as peroxides and hydroperoxides. Typical of such catalysts are di-tertiarybutyl peroxide, di-cumyl peroxide, tertiary amyl peroxide, cumene hydroperoxide, di(n-propyl) peroxydicarbonate, peresters such as amyl peroxyacetate and the like. Commercially available peroxy type initiators include, e.g., t-butyl peroxide or Triganox® B from AKZO, t-butyl peracetate or Triganox® FC50 from AKZO, t-butyl perbenzoate or Triganox® C from AKZO, and t-butyl perpivalate or Triganox® 25 C-75 from AKZO.

Polymerization is continued at or below the reflux temperature of the reaction mixture until a branched polymer is formed of the desired molecular weight.

Typical solvents that can be used to form the macromonomer or the branched polymer are ketones such as methyl ethyl ketone, isobutyl ketone, ethyl amyl ketone, acetone, alcohols such as methanol, ethanol, isopropanol, esters such as ethyl acetate, glycols such as ethylene glycol, propylene glycol, ethers such as tetrahydrofuran, ethylene glycol mono butyl ether and the like.

In the synthesis of the macromonomer and/or the branched polymer small amounts of difunctional alpha-beta unsaturated compounds can be used as, e.g., ethylene glycol dimethacrylate or hexane diol diacrylate.

After the branched polymer is formed, it is neutralized with an amine or an inorganic base such as ammonium hydroxide or sodium hydroxide and then water is added to form a dispersion. Typical amines that can be used include AMP (2-amino-2-methyl-1-propanol), dimethyl-AMP, amino methyl propanol, amino ethyl propanol, dimethyl ethanol amine, triethylamine and the like. One preferred amine is amino methyl propanol and the preferred inorganic base is ammonium hydroxide.

The conversion into a water dispersion may be accomplished preferably by stripping our 30 to 60% of the solvent followed by admixing with an organic amine or ammonia and diluting with water, or by admixing with a solution of water and amine after the solvent stripping. Alternatively, the branched polymer solution, after stripping, can be stirred slowly into a solution of water and the amine. The degree of neutralization of the dispersion can be from 10 to 150% of the total amount of acid groups, preferably from 40–100%. The final pH of the dispersion can accordingly be about 4–10, preferably 7–9. The solvents can be stripped-off eventually afterwards.

The overall branched polymer water borne dispersion should be characterized by an acid value of from 5 to about 150 (mg KOH/g resin solids), more preferably from 10 to about 70 and still more preferably from 15 to about 35, and an hydroxyl number of about 0 to about 250 (mg KOH/g resin solids), more preferably 5 from 40 to 150.

Particularly useful branched polymers include the following:

a branched polymer having a backbone of polymerized acrylate or methacrylate monomers, styrene monomers, methacrylic or acrylic acid monomers, and hydroxyfunctional acrylate or methacrylate monomers, and side chains of a macromonomer having a weight average molecular weight of about 2,000–30,000 and containing about 50% by weight, based on the weight of the backbone, of polymerized alkyl methacrylate or acrylate monomers, hydroxy-functional acrylate or methacrylate monomers and 2–30 % by weight, based on the weight of the backbone, of polymerized methacrylic acid or acrylic acid.

a branched polymer having the above backbone of side chains comprising polymerized methyl methacrylate, butyl acrylate, methacrylic acid, styrene, and hydroxyethyl acrylate.

a branched polymer having the above backbone and macromonomers comprising polymerized 2-ethylhexyl acrylate, butyl methacrylate, and hydroxyethyl methacrylate.

a branched polymer having the above backbone and macromonomers of isobutyl methacrylate, 2 ethyl hexyl methacrylate and hydroxy ethyl methacrylate.

The branched polymer is used as a dispersing resin to form an aqueous dispersion of a wide variety of hydrophobic materials that are commonly used in waterborne coating compositions. Typical hydrophobic materials include hydrophobic melamine resins, hydrophobic polyesters, hydrophobic acrylic polymers, hydrophobic polyurethanes, blocked organic polyisocyanates and mixtures of any of the above.

Typical hydrophobic melamines include partially or fully alkylated melamine formaldehyde resins having 1–4 carbon atoms in the alkylated group and that can be monomeric or polymeric having a degree of polymerization of about 1–3.

Typical alcohols that are used to alkylate these melamines are methanol, ethanol, propanol, butanol, isobutanol and the like. Typical commercially available melamine resins are as follows: "Cymel" 373, "Cymel" 385, "Resimine" 745, BM 7512 from Monsanto Corporation, HM 2608 from Monsanto Corporation, and BM 9539 from Monsanto Corporation.

Typical hydrophobic acrylic resins comprise polymers of alkyl methacrylates and acrylate, hydroxy alkyl acrylates and methacrylates and styrene such as a polymer of styrene, butyl methacrylate, butyl acrylate and hydroxy propyl acrylate.

Typical hydrophobic polyester resins are the esterification product of an aromatic dicarboxylic acid or an anhydride thereof and a polyol such as a polyester of phthalic anhydride, isophathalic acid, neopentyl glycol and trimethylol propane.

Typical blocked organic polyisocyanates that can be used are aliphatic polyisocyanates, aromatic polyisocyanate, cycloaliphatic polyisocyanates blocked with alcohols, ketimines, oximes and the like.

Typical hydrophobic polyurethanes include hydrophobic polyesters reacted with a polyisocyanate, hydrophobic acrylic polymers having reactive hydroxyl groups reacted with a polyisocyanate.

Cellulose acetate butyrate polymers such as CAB's from Eastman Chemical Company can be dispersed in aqueous compositions with the branched polymer and formulated into a waterborne coating composition.

The preferred method for forming the waterborne dispersion of this invention is to add with agitation the hydrophobic material to be dispersed to a solvent solution of the branched polymer before it is neutralized and dispersed in water and the neutralizing agent of amine or base is added with agitation. Water then is added and mixed in to form the aqueous dispersion. The resulting dispersion has a yield stress of about 0–1,000 Pa (Pascals), a low (20 sec−1) shear viscosity of about 100–10,000 m Pas (milli Pascal seconds) and a high shear (1000 sec−1) viscosity of about 10–1,000 m Pas measured on a Rotvfisco viscometer.

An alternative method for forming the water borne dispersion of this invention is to neutralized the branched polymer with amine or base and add water with constant agitation and the hydrophobic material to be dispersed to form a dispersion.

Waterborne coatings in which the dispersions of the present invention are used may optionally contain a latex of an acrylic-based polymer. These latexes are stable dispersions in water, typically as a dispersed latex polymer has an average particle size diameter of 10 nm to 1 micron, preferably 20 to 400 nm. These coating compositions contain about 10–70%, more typically 15–50% by weight of binder, and about 30–90%, more typically 50–85% by weight, of an aqueous carrier. The carrier is at least 50% water, preferably 75 to 95% water. Suitable waterborne coatings are prepared by blending other useful components in accordance with normal paint formulation techniques.

To form a coating composition which will crosslink under elevated baking temperatures of about 60°–180° C. for abut 5–60 minutes, about 10 to 40%, preferably 15 to 30% by weight, based on the weight of the binder, of a water-soluble water dispersible alkylated melamine formaldehyde crosslinking agent having 1–4 carbon atoms on the alkylated group can be used or a dispersion of a hydrophobic alkylated melamine formaldehyde resin of this invention can be used. These crosslinking agents are generally partially alkylated melamine formaldehyde compounds and may be monomeric or polymeric as described above.

These coating compositions containing a melamine crosslinking agent preferably contain about 0.1 to 1.0%, based on the weight of a binder, of a strong acid catalyst or a salt thereof to lower curing temperatures and time. Paratoluene sulfonic acid is a preferred catalyst or its ammonium salt. Other catalysts that can be used are dodecyl benzene sulfonic acid, phosphoric acid and amine or ammonium salts of these acids.

Although the dispersion of this invention is aqueous, a solvent can be utilized, preferably in minimal amounts, to facilitate formulation and application of the coating compositions formulated with these dispersions. An organic solvent is utilized which is compatible with the components of the composition.

In addition, coating composition utilizing the dispersion of the present invention may contain a variety of other optional ingredients, including pigments, fillers, plasticizers, antioxidants, surfactants and flow control agents.

Typical pigments that are used are metallic oxides such as titanium dioxide, iron oxides of various colors, zinc oxide, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzmilazolinones, and metallic flake pigments such as aluminum flake, nickel flake, pearlescent pigments and the like.

To improve weatherability of a finish formed from such coating compositions, an ultraviolet light stabilizer or a combination of ultraviolet light stabilizers can be added in the amount of about 0.1–5% by weight, based on the weight of the binder. The stabilizer may be added for example to a dispersion of this invention containing hydrophobic material or may be added directly to the coating composition or to pigment dispersions used to formulate the coating composition. Such stabilizers include ultraviolet light absorbers, screeners, quenchers, and specific hindered amine light stabilizers. Also, an anitoxidant can be added, in the about 0.1–5% by weight, based on the weight of the binder.

Typical ultraviolet light stabilizers that are useful include benzophenones, triazoles, triazines, benzoates, hindered amines and mixtures thereof Specific examples of ultraviolet stabilizers are disclosed in U.S. Pat. No. 4,591,533, the entire disclosure of which is incorporated herein by reference.

Such coating composition may also include conventional formulation additives such as flow control agents, for example, "Resiflow" S (polybutylacrylate), BYK 320 and 325 (high molecular weight polyacrylates); rheology control agents, such as fumed silica and thickeners such as the Acrylsol® copolymers from Rohm & Haas.

Coating compositions formulated with the dispersion of this invention have excellent adhesion to a variety of metallic or non-metallic substrates, such as previously painted substrates, cold rolled steel, phosphatized steel, and steel coated with conventional primers by electrodeposition. These coating composition can be used to coat plastic substrates such as polyester reinforced fiberglass, reaction injection-molded urethanes and partially crystalline polyamides. These coating compositions may be used a pigmented monocoats, as clear coats, as the pigmented base coat of a clear coat/base coat or as both the clear coat and the base coat.

Coating compositions formulated with the dispersion of this invention can be applied by conventional techniques such as spraying, electrostatic spraying, dipping, brushing, flowcoating and the like. The preferred techniques are spraying and electrostatic spraying. In OEM applications, the composition is typically baked at 100°–150° C. for about 15–30 minutes to form a coating about 0.1–3.0 mils thick. When the composition is used as a clearcoat, it is applied over the color coat which may be dried to a tack-free state and cured or preferably flash dried for a short period before the clearcoat is applied. The color coat/clearcoat finish is then baked as mentioned above to provide a dried and cured finish. The present invention is also applicable to non-baking refinish systems, as will be readily appreciated by those skilled in the art.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The following Examples illustrate the invention. All parts and percentages are on a weight basis unless otherwise indicated. All molecular weights disclosed herein are determined by GPC (gel permeation chromatography) using a polystyrene standard.

EXAMPLE 1

A branched polymer was prepared by first preparing a macromonomer and then polymerizing the macromonomer with monomers that form the backbone of the branched polymer. A dispersion was then prepared from the branched polymer.

Preparation of the macromonomer

A macromonomer of 5% IBMA (isobutyl methacrylate), 20% HEMA (hydroxyethyl methacrylate), and 75% 2EHMA (2-ethyl hexyl methacrylate), for use in a preparing a branched polymer was prepared as follows: to a 2-liter flask fitted with an agitator, condenser, heating mantle, nitrogen inlet, thermocouple and an addition port was added 15.25 g of IBMA monomer, 228.94 g of 2-EHMA monomer, 61.07 g of HEMA monomer and 251.3 g of propylene glycol monomethyl ether. The mixture was agitated and heated to reflux (128°–135° C.) under nitrogen. To this was then added, as a shot, a pre-mix of a solution of 0.5 g of Vazo® 88 initiator [1,1 azobis(cyanocyclohexane)]. 13.8 g of propylene glycol monomethyl ether and 26.1 g of a 0.17% solution of bis(boron difluoro diphenyl glyoximato) cobaltate(II) in ethyl acetate. This was followed by the addition of a pre-mix of a solution of 22.87 g of IBMA monomer, 343.42 g of 2-EHMA monomer, 91.61 g of HEMA monomer, 2 g of Vazo® 88 initiator, 10.0 g of ethyl acetate, 70.6 g of propylene glycol monomethyl ether over 240 minutes while maintaining a reflux temperature. (116°–122° C). Following a 30 min. hold period, a premixed solution of 0.4 g of Vazo® 88 initiator, 4.95 g of ethyl acetate and 18 g of propylene glycol monomethyl ether was added over 60 mins. while maintaining reflux. The batch was then held at reflux for an additional 60 mins. at which time a mixture of 0.3 g of t-butyl peroctoate and 33.35 g of ethyl acetate were added as a single add and then the reaction mixture was cooled. The macromonomer thus prepared has a number average molecular weight of 5322 and a weight average molecular weight of about 7627 as determined by GPC, weight solids are 61.9% and Gardner viscosity of U. The percent terminal vinyl unsaturation is greater than 95 as determined by thermogravimetric analysis.

Preparation of branched polymer

To a 2-liter flask fitted with an agitator, condenser, heating mantle, nitrogen inlet, thermocouple and an addition port was added 305.01 g of the macromonomer prepared above and 296.06 g of propylene glycol monomethyl ether and the temperature raised to reflux (110°–115° C.) under nitrogen. This was followed by the addition of a premixed solution of 122.98 g of methyl methacrylate monomer (MMA), 91.1 g of styrene monomer (STY), 91.1 g of hydroxy ethyl acrylate monomer (HEA), 118.42 g of butyl acrylate monomer (BA), 31.88 g methacrylic acid monomer (MAA), 8.2 g t-butyl peracetate and 86.54 g butyl acetate over 180 minutes holding temperature at reflux and then cooling the reaction mixture to room temperature. The branched polymer has a number average molecular weight of 14,710 and a weight average molecular weight of 37,190. Weight solids are 53.3% and Gardner viscosity is Y. The ration of backbone to macromonomer arms is about 60/40. The composition of the backbone is MMA/STY/BA/BEA/MAA in the weight ratio of 27/20/26/20/7.

Preparation of waterborne dispersion of branched polymer and hydrophobic melamine To a 2-liter flask fitted with an agitator, condenser, heating mantle, nitrogen inlet, thermocouple and an addition port was added 500 g of branched polymer prepared above and the temperature raised to distill 133 g of solvent. The batch was cooled to less than 50° C. at which time a 41.95 g of a 30% solution of ammonia in water was added to neutralize the acid functionality of the branch polymer. The batch was agitated for 10 mins. at which time 124.06 g. of a butylated melamine resin (BM 7512 from Monsanto Corp.) and 1.5 g heptane were added and the mixture was agitate for 15 minutes. At this time 588.28 g deionized water was slowly added over 60 minutes with good agitation and the resulting dispersion was cooled to room temperature. A white, stable dispersion of the branched polymer and butylated melamine was obtained having a total weight solids 35% (24.5% branched polymer and 10.5% butylated melamine), Gardner viscosity A, pH 8.31 and a particle size of 140 nanometers as determined by quasi electric light scattering. No phase separation of the butylated melamine was noted on standing at room temperature over 30 days.

EXAMPLE 2

Another waterborne dispersion of the branched polymer of Example 1 but with a different butylated melamine was prepared. 133.93 g of hydrophobic butylated melamine (HM 2608 from Monsanto) was used. A white, stable dispersion of the branched polymer and butylated melamine was obtained having a total weight solids 35% (24.5% branched polymer and 10.5% butylated melamine), Gardner viscosity A, pH 8.31 and a particle size of 45 nanometers as determined by quasi electric light scattering. No phase separation of the butylated melamine was noted on standing at room temperature over 30 days.

EXAMPLE 3

A third waterborne dispersion of the branched polymer of Example 1 and a different butylated melamine was prepared. 110.92 g of hydrophobic butylated melamine (BM 9539 from Monsanto) was used. A white, stable dispersion of the branched polymer and butylated melamine was obtained having a total weight solids 35% (24.5% branched polymer and 10.5% butylated melamine), Gardner viscosity A1D, pH 8.2 and a particle size of 116 nanometers as determined by quasi electric light scattering. No phase separation of the butylated melamine was noted on standing at room temperature over 30 days.

EXAMPLE 4

Preparation of a branched polymer

To a 5-liter flask fitted with an agitator, condenser, heating mantle, nitrogen inlet, thermocouple and an addition port was added 1762.0 g of macromonomer from Example 1 above, 237.96 g of hexanol and the temperature raised to 99°–101° C. under nitrogen. This was followed by the addition of a premixed solution of 392.8 g of MMA, 224.5 g of STY, 168.3 g HEA, 224.5 g of BA, 112.2 g MAA, 12.4 g of Vazo®88 initiator, 145.9 g of propylene glycol monomethyl ether and 145.9 g of butyl acetate over 120 min. holding the temperature at 99°–101° C. This was followed by a hold period of 60 min. at which time the temperature was reduced to 90° C. over a 30 minute period and the reaction mixture was held at this temperature of an additional 270 minutes and cooled to room temperature. The number average molecular weight of the branched polymer was 9080 and the weight average molecular weight was 17800. The weight solids are 64.4% and the Gardner viscosity is $Z_2$. The composition of the backbone is MMA/STY/HEA/BA/MAA in the weight ratio of 20 35/20/15/20/10 and the weight ratio of backbone to macromonomer about 40/60.

Preparation of waterborne dispersion of branched polymer and a water immiscible polyester To a 2-liter flask fitted with an agitator, condenser, heating mantle, nitrogen inlet, thermocouple and an addition port was added 300 g of branched polymer prepared above and the temperature raised to distill 58.3 g of solvent. The batch was cooled to less than 80° C. at which time a 7.96 g of dimethyl ethanol amine and 15.0 g water were added to neutralize the acid functionality of the branch polymer. The batch was agitated for 15 mins. at which time 118.4 g. of a polyester of a composition of (in equivalents) phthalic anhydride (0.528)/isophthalic acid (0.471)/neopentyl glycol (0.819)/trimethylol propane (0.057)/MPDIOL (0.236) diol from Arco Chemical. The polyester was a 69.8% solids solution in methyl amyl ketone and the polyester has a hydroxyl number of 58, and a number average molecular weight of 2115 and a weight average molecular weight of 5066. After the polyester was added the composition was agitated for 15 minutes and then 840.1 g deionized water was slowly added over a 30 minute period with good agitation and the dispersion was cooled to room temperature. A white, stable dispersion of the branched polymer and the polyester was obtained having a total weight solids 25% (17.5% branched polymer and 7.5% polyester), Gardner viscosity A3, pH 8.6 and a particle size of 260 nanometers as determined by quasi electric light scattering. No phase separation of the polyester was noted on standing at room temperature over 30 days.

EXAMPLE 5

Preparation of waterborne dispersion of branched polymer and a water immiscible acrylic polymer To a 2-liter flask fitted with an agitator, condenser, heating mantle, nitrogen inlet, thermocouple and an addition port was added 300 g of branched polymer prepared above Example 12 and the temperature raised to distill 58.3 g of solvent. The batch was cooled to less than 80° C. at which time a 7.96 g of dimethyl ethanol amine and 15.0 g water were added to neutralize the acid functionality of the branch polymer. The batch was agitated for 15 mins. at which time 118.4 g. of an acrylic polymer of a composition of styrene/butyl methacrylate/butyl acrylate/hydroxy propyl acrylate (weight ratio of 15/30/17/38), 70% solids in Solvesso™ (Shell Chemical) and the acrylic polymer has a number average molecular weight 2300 and weight average molecular weight 6220 was added and the mixture agitated for 15 minutes. and then 840.1 deionized water was slowly added over a 30 minute period with good agitation and the dispersion was cooled to room temperature. A white, stable dispersion of the branched polymer and the acrylic polymer was obtained having a total weight solids 25% (17.5% branched polymer and 7.5% polyester), Gardner viscosity A3, pH 8.68 and a particle size of 133 nanometers as determined by quasi electric light scattering. No phase separation of the acrylic polymer was noted on standing at room temperature over 30 days.

Various modifications, alterations, additions or substitutions of the components of the compositions of this invention will be apparent to those skilled in the art without departing from the scope and spirit of this invention. This invention is not limited to the illustrative embodiments set forth herein, but rather the invention is defined by the following claims.

We claim:

1. A stable waterbased dispersion useful for forming aqueous coating compositions comprising a dispersed hydrophobic partially or fully alkylated melamine resin having 1–4 carbon atoms in the alkyl group and a degree of polymerization of 1–3, an aqueous carrier and a branched polymer dispersant (binder); wherein the branched polymer formed in organic solvent has a weight average molecular weight of about 5,000–100,000 and comprises 20–80% by weight of a hydrophilic backbone and correspondingly 80–20% by weight of macromonomer side chains; wherein the backbone consists essentially of polymerized ethylenically unsaturated monomers and 2–30% by weight, based on the weight of the backbone of polymerized ethylenically unsaturated monomers having an acid-functional group; and the side chains consist essential of macromonomers of polymerized ethylenically unsaturated monomers that are polymerized into the backbone via an ethylenically unsaturated group and the macromonomers have a weight average molecular weight of about 1,000–30,000 and wherein the weight ratio of hydrophobic melamine resin to binder is about 1/100 –200/100; and wherein the hydrophobic melamine resin being dispersed in the branched polymer formed in organic solvent and thereafter adding water and amine or an inorganic base thereby inverting the polymer into water to form the dispersion wherein at least 10% of the acid functional groups of the polymer are neutralized with the amine or inorganic base and the backbone of the polymer is hydrophobic in comparison to the side chains.

2. The dispersion of claim 1 wherein the backbone of the branched polymer comprises 3–15% by weight of monomers which have a carboxylic acid functionality or salt thereof.

3. The dispersion of claim 2 wherein the branched polymer comprises 5–40% by weight of polymerized monomers which have a hydroxy functionality.

4. The dispersion of claim 1 in which the backbone of the branched polymer contains 2–30% by weight of an acid functional monomer and wherein the polymer has a weight average molecular weight of 5000 to 40,000, an acid value of 5–150, and a hydroxyl value of 0–250.

5. The dispersion of claim 1 wherein the branched polymer has a hydroxyl value of 40–150, an acid value of 10–70 and a weight average molecular weight of 5,000–40,000.

6. The dispersion of claim 5, wherein said backbone and macromonomers further comprises polymerized ethylenically unsaturated monomers not containing carboxylic functionality, which monomers are selected from the group consisting of alkyl acrylates, alkyl methacrylates, cycloaliphatic acrylates, cycloaliphatic methacrylates, aryl acrylates, aryl methacrylates, styrene, alkyl styrene, acrylonitrile, hydroxy alkyl acrylates, hydroxy alkyl methacrylates and mixtures thereof; and wherein the backbone contains ethylenically unsaturated monomers containing carboxylic functionality selected from the group consisting of acrylic acid and methacrylic acid, wherein the above mentioned alkyl, cycloaliphatic, and aryl groups have 1 to 12 carbon atoms.

7. A coating composition, useful for coating a substrate, which composition comprises an aqueous carrier and a film forming binder and about 1–50% by weight of the dispersion of claim 1.

8. A process for preparing the dispersion of claim 1 in which the polymer is a branched polymer comprising a polymeric backbone having a plurality of macromonomers polymerized into the backbone having carboxylic functionality, the process comprising (a) preparing macromonomers, in an organic solvent, by polymerizing ethylenically unsaturated monomers using a catalytic chain transfer agent containing cobalt to form a macromonomer having one terminal ethylenically unsaturated bond;

(b) forming, in an organic solvent, the branched polymer by polymerizing, in the presence of said macromonomers prepared in step (a), ethylenically unsaturated monomers containing 2 to 30% by weight of carboxylic acid groups, whereby said macromonomers are incorporated into said backbone by polymerizing the terminal ethylenically unsaturated bond with the ethylenically unsaturated monomers of the backbone, thereby forming a branched polymer with a molecular weight of 5,000–100,000, (c) dispersing the hydrophobic melamine resin in the organic solvent branched polymer composition formed in (b) above, (d) adding water and amine or an inorganic base to the composition formed in (c) above thereby neutralizing at least 10% of the acid functional groups of the polymer and inverting into water to form a dispersion;

wherein the dispersion has a yield stress of 0–1,000 Pascals, a low (20 sec−1) shear viscosity of about 100–100,000 milliPascal seconds and a high shear (1,000 sec−1) viscosity of about 10–1,000 milliPascals seconds.

* * * * *